No. 676,829. Patented June 18, 1901.
C. T. WYGANT.
COUPLING AND SUPPORTING MEANS FOR VEHICLES.
(Application filed Mar. 28, 1901.)

(No Model.)

WITNESSES:
INVENTOR.
Charles T. Wygant.
BY
ATTORNEY.

THE NORRIS PETERS CO., PHOTO-LITHO., WASHINGTON, D. C.

UNITED STATES PATENT OFFICE.

CHARLES T. WYGANT, OF DENVER, COLORADO, ASSIGNOR OF ONE-THIRD TO MARY E. WYGANT, OF SAME PLACE.

COUPLING AND SUPPORTING MEANS FOR VEHICLES.

SPECIFICATION forming part of Letters Patent No. 676,829, dated June 18, 1901.

Application filed March 28, 1901. Serial No. 53,352. (No model.)

*To all whom it may concern:*

Be it known that I, CHARLES T. WYGANT, a citizen of the United States of America, residing at Denver, in the county of Arapahoe and State of Colorado, have invented certain new and useful Improvements in Coupling and Supporting Means for Vehicles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in coupling and supporting means for the front part of heavy wagons or vehicles having a loose reach, my object being to increase the wearing capacity of these parts, and thus increase the durability, efficiency, and general utility of this class of wagons.

Generally speaking, my improvement consists in applying metal wearing-surfaces to the reach, sand-board, and forward axle of vehicles of the heavier class, all of which will now be described in detail and the novel features subsequently pointed out in the claims.

The invention will be understood by reference to the accompanying drawings, in which is illustrated an embodiment thereof.

Figure 1:
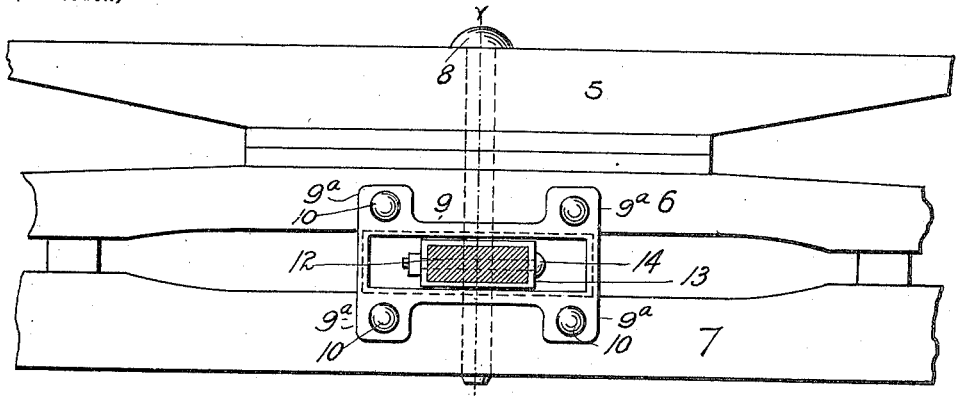
Figure 2:
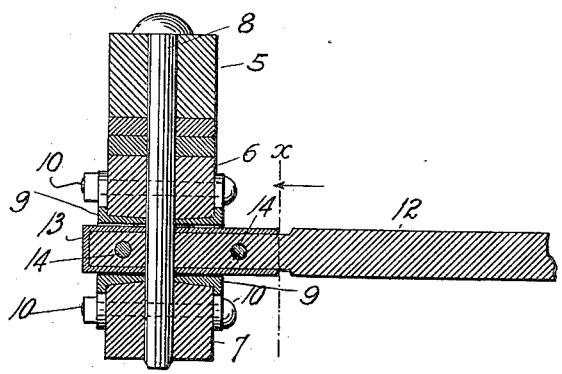
Figure 3:
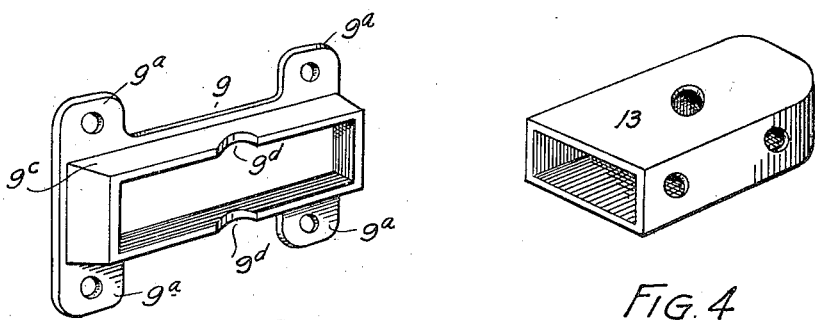
Figure 4:
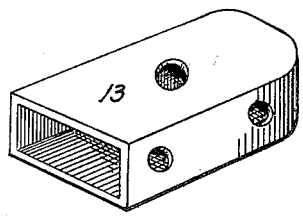

In the drawings, Figure 1 is a rear elevation of the front gear of a vehicle equipped with my improvements, the reach being shown in section taken on the line $x\,x$, Fig. 2. Fig. 2 is a section taken on the line $y\,y$, Fig. 1. Fig. 3 is a perspective view of the wearing and supporting members which are applied to the sand-board and axle of wagons equipped with my improvements. Fig. 4 is a perspective view in detail of the metal housing for the front end of the reach.

The same reference characters indicate the same parts in all the views.

Let the numerals 5, 6, and 7, respectively, designate the bolster, sand-board, and front axle of a vehicle, the said parts being connected by a king-bolt 8. To the sand-board and axle are applied two metal wearing members 9, one being located in front and the other in the rear. Each of these members is provided with two upwardly-projecting and two depending lugs $9^a$, the two members being secured by bolts 10, passed through the openings formed in these lugs and openings in the sand-board and axle registering therewith. Each member 9 is hollow and the opening therein is surrounded by a flange $9^c$, which passes into the space between the axle and sand-board to contact with the king-bolt, the top and bottom flange parts being recessed to fit the bolt, as shown at $9^d$. The flanges $9^c$ of the two coupling members enter the space between the axle and the sand-board from opposite sides and form a metal lining therefor and a metal wearing-surface for the forward extremity of the reach 12, which is equipped with a metal housing 13, secured thereto by means of bolts 14, passed through the housing and reach from the sides or in any other suitable manner. The parts 9 may be cemented to the wood parts, to which they are applied as an additional fastening means. It will thus be seen that by virtue of my improvements the axle, sand-board, and reach are strengthened and supported and the bolster and sand-board are prevented from tipping forward and back, as is generally the case after the said parts have become somewhat worn. The members 9, as well as the part 13, are preferably made of malleable iron, and they may be made of a size to fit any wagon.

Having thus described my invention, what I claim is—

1. The combination with the reach, sand-board and front axle, of a metal housing applied to the forward extremity of the reach, and two metal members inserted respectively from the front and rear, in the reach-opening between the sand-board and axle, each member being secured to the sand-board and axle and the said members being provided with flanges forming a metal lining for the reach-opening.

2. The combination with the sand-board and axle, of two metal wearing members forming a lining for the reach-opening between the said parts, the lining portion of the members, being inserted respectively from the front and rear and each member having exterior parts engaging the sand-board and axle, and suitable means applied to these parts for securing the wearing members in place.

In testimony whereof I affix my signature in presence of two witnesses.

CHARLES T. WYGANT.

Witnesses:
  DORA C. SHICK,
  MARY C. LAMB.